March 4, 1941.   L. R. LOWRY, SR   2,233,742
SAFETY WHEEL
Filed Jan. 23, 1940

Inventor
Lloyd R. Lowry, Sr.

By Clarence A. O'Brien
and Hyman Berman.
Attorneys

Patented Mar. 4, 1941

2,233,742

UNITED STATES PATENT OFFICE 2,233,742

SAFETY WHEEL

Lloyd R. Lowry, Sr., Weatherford, Okla., assignor of one-half to Richard Stanley, Weatherford, Okla.

Application January 23, 1940, Serial No. 315,273

1 Claim. (Cl. 301—39)

My invention relates to improvements in wheels for pneumatic tired vehicles, and an important object of the invention is to provide such a wheel which involves a detachable annulus which when in place is concentric with the tire but of smaller diameter, for the purpose of engaging the ground in event of a blow-out or puncture of the tire and enables the vehicle to be safely driven without overturning and without crushing and injuring the deflated tire.

Other important objects and advantages of the invention are made to appear in the following description and appended drawing, showing a preferred embodiment of the invention.

Figure 1:
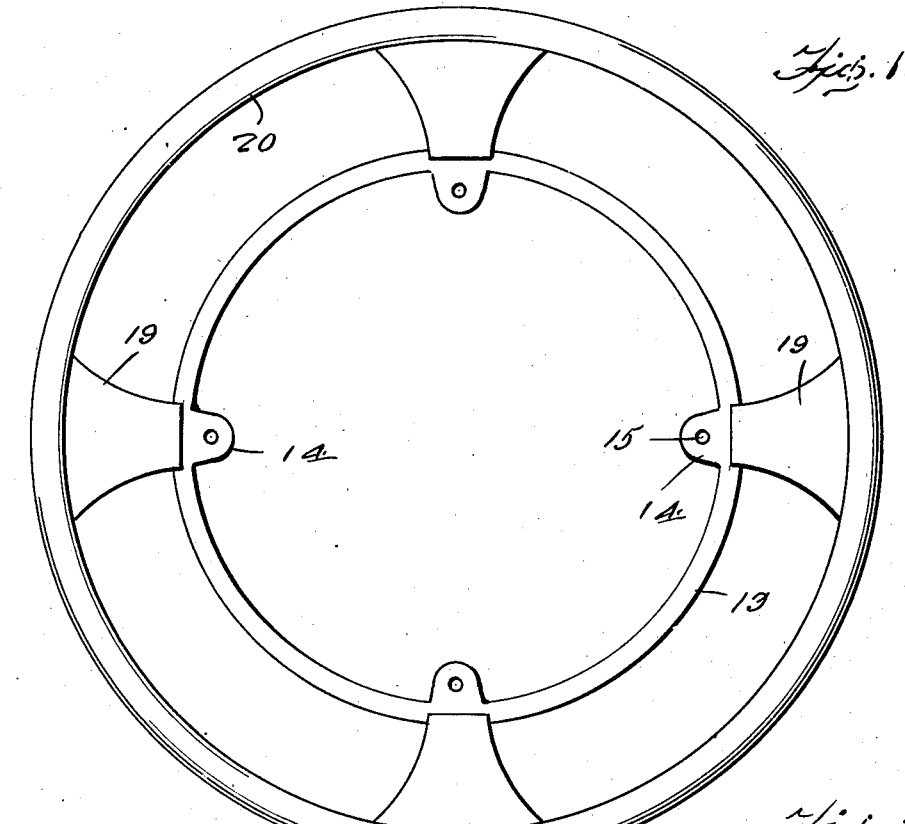
Figure 1 is an inboard side elevational view of the annulus showing the same detached from the wheel proper.

In the drawing wherein for the purpose of illustration is shown a preferred embodiment of the invention, the numeral 5 generally designates a pneumatic tire mounted on the conventional rim 6 which includes a drop center portion 7 to which the wheel web 8 is attached, the latter having conventional chain fastener accommodating holes 9 distributed therearound. In accordance with the present invention I provide a clamping ring 10 which is flat in cross-section and of a width similar to the depth or radial width of the outboard side of the portion 7 and which is adapted to bear thereagainst. The ring 10 has radially inwardly projecting lugs 11 matching the wheel web holes 9 in location, and provided with bolt holes 12. To engage the inboard side of the portion 7 there is provided another ring 13 which is heavier than the ring 10 and of generally square cross section with lugs 14 projecting radially inwardly therefrom and positioned and provided with bore holes 15 like the lugs 11. The lugs 14 are spaced inboardly with respect to the drop center-engaging side of the ring 13. With the lugs 14 and 11 aligned, the bolts 16 are passed through the lugs 14, through the web holes 9, and through the lugs 11 and the nut 17 turned up tight, to install the safety annulus on the wheel.

Figure 2:
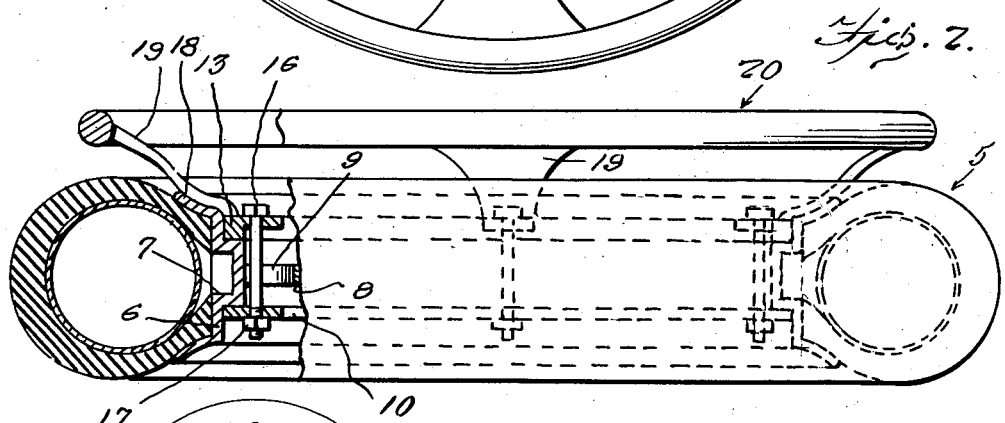
Figure 2 is a top plan view partly in section, showing the annulus installed on the inboard side of the wheel.
Figure 3:
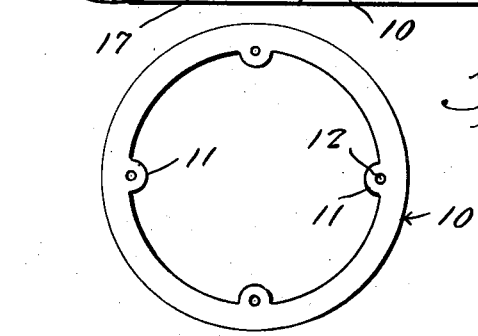
Figure 3 is a plan view of the clamping ring.

The ring 13 which is substantially the width of the rim 6 measured from the portion 7 to the inboard flange 18, has projecting radially outwardly from the inboard side thereof, in alignment with the lugs 14, the segmental-shaped outwardly flaring spokes 19, which are pitched and curved to follow the devious contour of the flange 18 and extend in spaced relation to the side of the tire 5, as shown in Figure 2. At about the median belt of the side wall of the tire 5, the radially outward ends of the spokes 19 have attached thereto the rounded cross-section ground-engaging annulus 20 which is arranged to engage the ground and support the wheel when the tire becomes under-inflated or blows out. The spokes and the annulus are sufficiently laterally spaced from the wheel to provide for lateral expansion of the flat tire, and the annulus 20 is sufficiently widely spaced outwardly from the rim 6 to prevent injurious crushing of the deflated tire between the rim 6 and the ground.

It is thought that persons skilled in the art to which the invention relates will be able to obtain a clear understanding of the invention after considering the description in connection with the drawing. Therefore, a more lengthy description is regarded as unnecessary.

Since excellent results are obtainable from the details disclosed, they are preferably followed. However, within the scope of the invention as claimed, numerous modifications may, of course, be made.

Having described the invention what is claimed as new is:

In combination, a pneumatic tire, a rim mounting such tire, said rim including an inwardly extending central part and a rim flange, projecting on one side of the central part, a wheel web supporting said rim and attached to said central part, said wheel web having circumferentially spaced openings adjacent the central part, a clamping ring engaging one side of said central part and having legs registered with said openings, a mounting ring engaging the opposite side of said central part and reaching to said rim flange, said mounting ring having lugs registering with said openings and the first-mentioned lugs, clamping bolts traversing said openings and each of said registered lugs and holding the rings in place, spokes radiating from said mounting ring and lying along said rim flange, and a ground-engaging annulus fixed to the outer ends of said spokes, and thereby supported in laterally spaced relation to and concentrically spaced inwardly from the periphery of the tire.

LLOYD R. LOWRY, Sr.